United States Patent
Bush et al.

(10) Patent No.: US 6,698,215 B2
(45) Date of Patent: Mar. 2, 2004

(54) LEVEL SENSORY DEVICE AND MOUNTING BRACKET THEREFOR

(75) Inventors: Joseph Paul Bush, Lawrenceville, GA (US); Colby Wayne Logan, Grenada, MS (US)

(73) Assignee: Advanced Distributor Products LLC, Grenada, MS (US)

( * ) Notice: Subject to any disclaimer, the term of this patent is extended or adjusted under 35 U.S.C. 154(b) by 29 days.

(21) Appl. No.: 10/160,392

(22) Filed: May 31, 2002

(65) Prior Publication Data

US 2003/0221439 A1 Dec. 4, 2003

(51) Int. Cl.[7] .................. F25D 21/00; A47B 96/06
(52) U.S. Cl. .................. 62/150; 62/285; 248/213.2
(58) Field of Search .................. 62/150, 285, 129, 62/125, 291; 248/213.2, 214, 229.25, 226.11; 340/620, 623

(56) References Cited

U.S. PATENT DOCUMENTS

| | | | |
|---|---|---|---|
| 3,185,789 A | | 5/1965 | Gunther |
| 3,205,676 A | | 9/1965 | Walker et al. |
| 3,684,230 A | * | 8/1972 | Swanquist ............ 248/229.26 |
| 3,757,316 A | | 9/1973 | Fiorenzo |
| 3,984,877 A | * | 10/1976 | Kirby ..................... 340/620 |
| 4,633,673 A | | 1/1987 | Morrison et al. |
| 4,787,212 A | | 11/1988 | Hessey |
| 4,896,052 A | | 1/1990 | Morrison et al. |
| 4,937,559 A | | 6/1990 | Meacham et al. |
| 5,359,738 A | * | 11/1994 | Kurtz ..................... 4/661 |
| 5,522,229 A | | 6/1996 | Stuchlik, III et al. |
| 6,041,611 A | | 3/2000 | Palmer |

OTHER PUBLICATIONS

Brochure "J–Series Switch", Hartell Pumps.
Beckett Corporation Product Catalog Page for Model 1502—Safety Control Switch.

* cited by examiner

Primary Examiner—Chen Wen Jiang
(74) Attorney, Agent, or Firm—Brooks Kushman P.C.

(57) ABSTRACT

A level sensing device (10) for a drain pan (50) which collects fluid from a source of fluid (40) in an associated HVAC unit (39). The drain pan (50) has at least one side wall (55). The device (50) has a bracket (12) having agenerally U-shaped portion with first and second legs (16, 18). The generally U-shaped portion serves to mount the device (10) to the at least one side wall (55) of the drain pan (50). A shelf (20) extends from the second leg (16) of the bracket (12). A switch (24) is secured to the bracket (12). The switch (24) is triggered when the fluid level (65) rises above a predetermined level causing electrical power to the associated HVAC unit (39) to be shut off. An HVAC unit (39) employing this device is also disclosed.

19 Claims, 2 Drawing Sheets

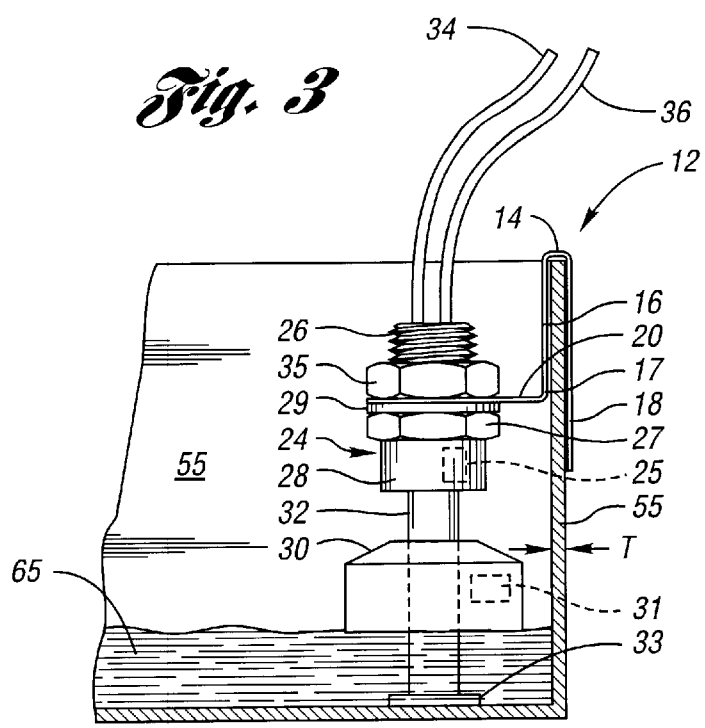
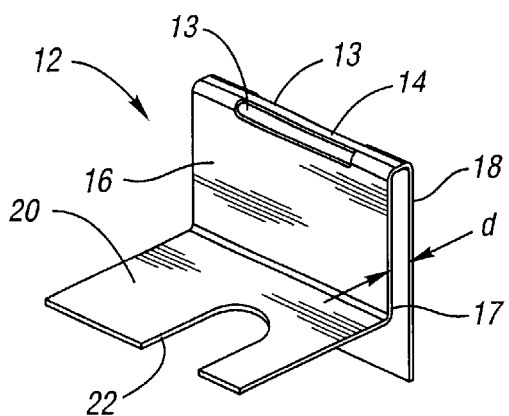
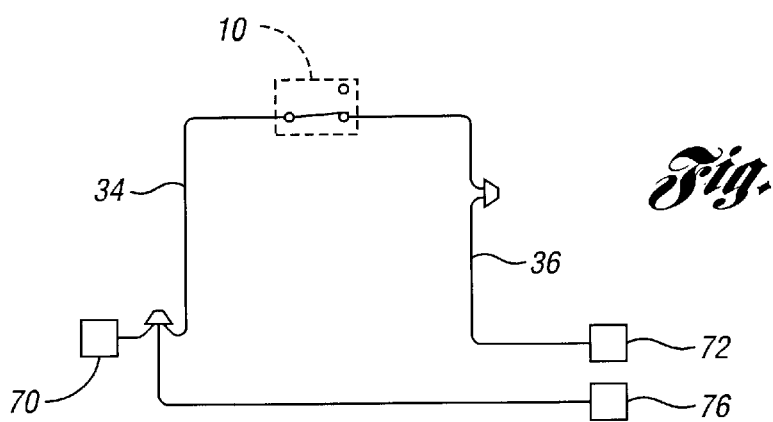

LEVEL SENSORY DEVICE AND MOUNTING BRACKET THEREFOR

BACKGROUND OF THE INVENTION

1. Field of the Invention

The present invention relates to level sensing devices and, in particular, to a device for use on a heating, ventilation, or air conditioning unit.

2. Background Art

Level sensing devices, such as float devices, for monitoring fluid accumulation in drain pans of HVAC units are well known. However, the prior art devices have substantial drawbacks. For example, the prior art systems generally require substantial space around the drain pan and the HVAC unit in general to physically install and service the device or to prepare the drain pan for assembly of the device. Some devices also require physical modification of the drain pan to secure the device to the drain pan.

Accordingly, a need exists for a level sensing device that does not require substantial space to install the level sensing device and does not require physical modification of the drain pan.

SUMMARY OF THE INVENTION

According to one aspect of the present invention, a level sensing device for a drain pan which collects fluid from a source of fluid in an associated HVAC unit is disclosed. The drain pan has at least one side wall. The level sensing device has a bracket having a generally U-shaped portion with a first leg and a second leg. The generally U-shaped portion serves to mount the level sensing device to the at least one side wall of the drain pan. A shelf extends from the second leg of the bracket. A switch is secured to the bracket. In one embodiment, the switch is triggered when the fluid level rises above a predetermined level to cause electrical power to the associated HVAC unit to be shut off.

According to another aspect of the present invention, a bracket for mounting a switch to a sidewall having a thickness is disclosed. The bracket has a generally U-shaped portion with a first leg and a second leg. The generally U-shaped portion serves to mount the switch to the sidewall. A shelf extends from the second leg. The shelf has an opening formed therein. In one embodiment, a distance between at least a portion of the first leg and a portion of the second leg is less than the thickness of the sidewall.

According to yet another aspect of the present invention, an electrically powered HVAC unit is disclosed. The HVAC unit has a source of fluid and a drain pan to collect the fluid. The HVAC unit also has a bracket that includes a generally U-shaped portion with a first leg and a second leg. The generally U-shaped portion serves to mount the bracket to the at least one side wall of the drain pan. The bracket further has a shelf extending from the second leg. A switch is secured to the bracket. The switch is triggered when the fluid level rises above a predetermined level. The triggered switch causes the electrical power to be shut off.

The above features and advantages of the present invention are readily apparent from the following detailed description of the best mode for carrying out the invention when taken in connection with the accompanying drawings.

BRIEF DESCRIPTION OF THE DRAWINGS

FIG. 3 is a side view of the level sensing device of the present invention attached to a drain pan;

FIG. 4 is a perspective view of the bracket of the level sensing device of the present invention; and FIG. 5 is an electrical schematic of the level sensing device of the present invention.

DETAILED DESCRIPTION OF THE PREFERRED EMBODIMENT(S)

Figure 1:
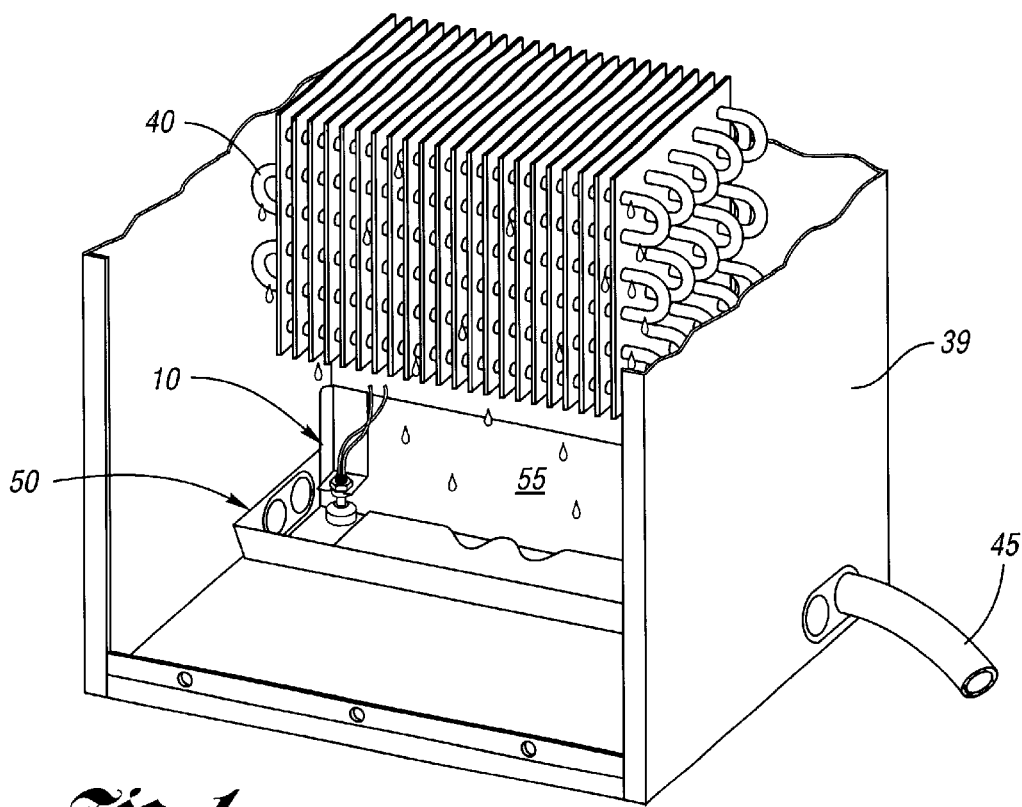
FIG. 1 is a perspective, partially broken view of an HVAC unit showing the level sensing device of the present invention attached to a drain pan.
Figure 2:
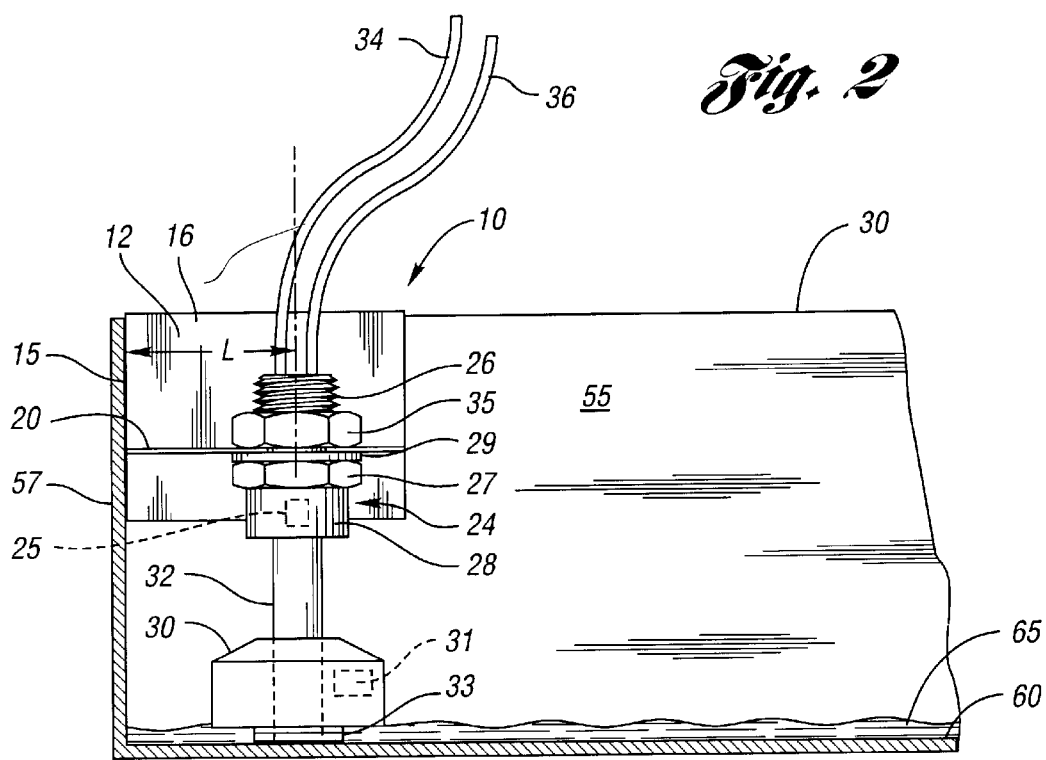
FIG. 2 is a front view of the level sensing device of the present invention attached to a drain pan.

Referring now to FIG. 1, a level sensing device 10 according to the present invention is shown attached to a side wall 55 of a drain pan 50 in a heating, ventilation, or air conditioning (hereinafter "HVAC") unit 39 or other system that provides a source of fluid. For example, the HVAC unit 39 may be a heat pump, heater, furnace, air conditioner, or other type of device that conditions or treats air.

The HVAC unit 39 includes a source of fluid 40. The source 40 may be, for example, an evaporator coil when the HVAC unit 39 is an air conditioner. If the HVAC unit 39 is operating as an air conditioner, cool fluid passes through the evaporator coil. As warm air is forced over or through the evaporator coil, dehumidification of the air causes water vapor to condense on the coil and drip into the drain pan 50.

The drain pan 50 is provided with a drain 45 which directs fluid to a location where it can be disposed of properly without overflowing the HVAC unit 39. If the drain pan 50 overflows, the fluid in the drain pan may damage the HVAC unit 39 or may damage surrounding equipment or structure.

Referring now to FIGS. 2–5, the level sensing device 10 is shown in greater detail. The device comprises an inverted generally U-shaped bracket 12 having first and second legs 18, 16 extending downwardly from a base 14. Preferably, the first and second legs 18, 16 extend downwardly at substantially 90 degrees from the base 14. However, for certain applications, the downwardly extending angle of the first and second legs 18, 16 may be different. Alternatively, the first and second legs 18, 16 can be attached to each other and therefore, the base 14 would not be required. A shelf 20 extends outwardly from the lower end 17 of the second leg 16. The shelf 20 preferably extends outwardly from the second leg 16 such that it is essentially parallel to the bottom of the drain pan 50. Accordingly, the shelf 20 may be angled at approximately 90 degrees to the second leg 16, as shown in the Figures, or at another angle. An aperture or opening 22 is formed on the shelf 20 to receive a switch 24. The aperture or opening 22 may be a cut-out portion, as shown, or a bore through the shelf 20.

Preferably, the bracket 12 is manufactured out of 0.030 inch thick G-90 steel, though other steels and other materials of different sizes may also be used. The bracket 12 is preferably formed such that the distance between at least some portions of the first and second legs 18, 16 is smaller than the thickness T of the side wall 55 to provide the required tension to keep the bracket in place on the side wall. The first and second legs 18, 16 may be squeezed together to create a snug fit. Alternatively, protrusions (not shown) on the first and second legs spaced apart by a distance less than the thickness of the side wall can be provided to create the necessary tension required to keep the bracket 12 in place on the side wall. The formed bracket 12 preferably has some "spring" so that the legs 16 and 18 are urged together when spread apart. The preformed bracket may have cutout portions 13 to facilitate forming the first and second legs 16, 18 of the bracket.

One type of switch 24 which may be used with the level sensing device 10 comprises a threaded portion 26, a body 28, a stem 32, a float 30, and a microswitch 25. A locking washer 33 secures the float 30 to the stem 32. The float 30 is in a sliding engagement with the stem 32 such that as the fluid level 65 rises, the float 30 also rises. The float 30 preferably contains magnetic material 31. At a predetermined level of fluid 65 in the drain pan 50, the magnetic material 31 in the float triggers the microswitch 25. As shown in the electrical schematic illustrated in FIG. 5, the microswitch 25 is in a normally closed position when the fluid level 65 is below the predetermined level thereby completing the circuit and providing electrical power to the HVAC unit 39 so that it can operate. When the fluid level 65 in the drain pan 50 rises to the predetermined level, the normally closed microswitch 25 opens the electrical circuit, thereby interrupting the electrical power to the HVAC unit 39 and temporarily shutting it off. By shutting off the HVAC unit 39, further fluid generation is arrested.

Alternatively, the switch 24 can be wired in a normally open position. When the fluid level 65 in the drain pan 50 rises to a predetermined level, and the microswitch 25 is triggered, the circuit closes, and a warning signal can be produced.

One example of a switch that may be used in the present invention is the LS01 Series Level Sensors with magnetic floats that are available from Meder Electronics. Of course, one skilled in the art could devise a level sensing device using other types of fluid level sensors with either a magnetic or non-magnetic float or other means for opening and closing an electrical circuit that may not require a float.

To assemble the level sensing device 10, a stop or nut 27 may be threaded onto the threaded portion 26. Alternatively, the body 28 may have an integral stop or nut portion. An O-ring 29 is preferably placed on the stop or nut 27. The threaded portion 26 of the switch 24 is placed in or through the aperture 22 such that the O-ring is sandwiched between the bracket 12 and the nut 27 or body 28. A threaded nut 35 is turned onto the threaded portion 26 thereby securing the switch 24 to the bracket 12.

To mount the level sensing device 10 onto the drain pan 50, the bracket 12 is saddled onto the side wall 55 such that the first and second legs 18, 16 are urged against the side wall 55 thereby maintaining the bracket in position on the side wall. Unlike prior art devices, this level sensing device 10 requires minimal space outside the drain pan 50 and negates the need to drill bores into the drain pan to secure the bracket 12. Preferably, the bracket 12 is slid along the side wall 55 until a side 15 of the bracket abuts an adjacent drain pan side wall 57 or the radius between the side walls 55, 57. The distance L from one side of the bracket to the centerline of the opening 22 is optimized based on the individual properties of the drain pan 50 and the switch 24 to provide proper spacing of the level sensing switch from the side wall 57.

Electrical leads 34 and 36 are wired into the electrical circuit of the HVAC unit. One possible configuration of the electrical circuit is shown in FIG. 5 having a thermostat 70 and electrical connections 72, 76 for the HVAC unit. As previously discussed, the level sensing device 10 is preferably wired in a normally closed manner so when the fluid level 65 rises, the electrical power to the HVAC unit 39 is temporarily shut off. When the fluid level 65 subsides, and the float 30 lowers, the circuit closes and power is restored to the HVAC unit 39.

The dimensions of the bracket 12 and the switch 24 are designed to provide optimal performance for particular drain pan 50 configurations. Drain pans 50 of different dimensions may require different sized brackets 12 and switches 24 to properly set the predetermined level at which electrical power is interrupted. The device 10 can also be adjusted for various predetermined levels by placing spacers between the body portion 28 or nut 27 of the switch 24 and the shelf 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A level sensing device for a drain pan which collects fluid from a source of fluid in an associated HVAC unit, the drain pan having at least one side wall, the level sensing device comprising:

a bracket having a generally U-shaped portion with a first leg and a second leg, the generally U-shaped portion serving to mount the level sensing device to the at least one side wall of the drain pan;

a shelf extending from the second leg of the bracket; and a switch secured to the bracket, the switch being triggered when the fluid rises above a predetermined level to cause electrical power to the associated HVAC unit to be shut off.

2. The device of claim 1 wherein a distance between at least a portion of the first leg and a portion of the second leg is less than a thickness of the at least one side wall of the drain pan such that the legs of the bracket are biased against the side wall, thereby retaining the bracket to the drain pan.

3. The device of claim 1 wherein the bracket further comprises a base connecting the first and second legs, the base being positionable in contact with an upper edge of the at least one side wall.

4. The device of claim 3 wherein the first and second legs extend downwardly from the base at substantially ninety degrees.

5. The device of claim 1 wherein the shelf has an opening formed therein.

6. The device of claim 5 wherein the opening is offset from a centerline of the shelf.

7. The device of claim 1 wherein the switch has a threaded portion sized to be inserted through an opening formed in the shelf, the device further comprising:

a threaded nut sized to engage the threaded portion of the switch to secure the switch to the shelf.

8. The device of claim 1 wherein the switch further comprises a float that rises and falls in response to fluid level.

9. A bracket for mounting a switch in relation to a sidewall having a thickness, the bracket comprising:

a generally U-shaped portion with a first leg and a second leg, the generally U-shaped portion serving to mount the switch in relation to the sidewall; and a shelf extending from the second leg, the shelf having an opening formed therein, the opening being configured as a generally U-shaped slot with one open side for receiving the switch into the opening.

10. The bracket of claim 9 wherein a distance between at least a portion of the first leg and a portion of the second leg is less than the thickness of the sidewall.

11. The bracket of claim 9 wherein the bracket further comprises:

a base connecting the first and second legs.

12. The bracket of claim 11 wherein the first and second legs extend downwardly from the base at substantially ninety degrees thereto.

13. The bracket of claim 9 wherein the opening is offset from a centerline of the shelf.

14. An electrically powered HVAC unit comprising:
   a source of fluid;
   a drain pan to collect the fluid, the drain pan having at least one side wall;
   a bracket having an inverted generally U-shaped portion with a first leg and a second leg, the generally U-shaped portion serving to mount the bracket to the at least one side wall, the bracket further having a shelf extending from the second leg; and
   a switch secured to the bracket, the switch being triggered when the fluid rises above a predetermined level to cause the electrical power to be shut off.

15. The HVAC unit of claim 14 wherein a distance between at least a portion of the first leg and a portion of the second leg is less than a thickness of the at least one side wall of the drain pan such that the legs of the bracket are biased against the side wall, thereby retaining the bracket to the drain pan.

16. The HVAC unit of claim 14 wherein the bracket further comprises a base connecting the first and second legs, the base being positionable in contact with an upper edge of the at least one side wall.

17. The HVAC unit of claim 16 wherein the first and second legs extend downwardly from the base at substantially ninety degrees.

18. The HVAC unit of claim 14 wherein the shelf has an opening formed therein.

19. The HVAC unit of claim 14 wherein the HVAC unit is an air conditioner and wherein the source of fluid is an evaporator.

* * * * *